United States Patent
Jonsson et al.

(10) Patent No.: US 10,009,281 B2
(45) Date of Patent: Jun. 26, 2018

(54) RBS, RNC AND RESPECTIVE METHODS PERFORMED THEREBY FOR TRANSMITTING DATA TO A UE

(71) Applicant: Telefonaktiebolaget LM Ericsson (publ), Stockholm (SE)

(72) Inventors: Anders Jonsson, Taby (SE); Aleksandar Jovanovic, Solna (SE); Roger Wallerius, Savedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 15/117,698

(22) PCT Filed: Feb. 14, 2014

(86) PCT No.: PCT/SE2014/050186
§ 371 (c)(1),
(2) Date: Aug. 9, 2016

(87) PCT Pub. No.: WO2015/122815
PCT Pub. Date: Aug. 20, 2015

(65) Prior Publication Data
US 2016/0366066 A1    Dec. 15, 2016

(51) Int. Cl.
*H04L 12/801* (2013.01)
*H04W 28/02* (2009.01)

(52) U.S. Cl.
CPC ......... *H04L 47/34* (2013.01); *H04W 28/0205* (2013.01)

(58) Field of Classification Search
CPC . H04W 28/02; H04W 28/0205; H04W 36/00; H04L 12/801; H04L 47/34
See application file for complete search history.

(56) References Cited

U.S. PATENT DOCUMENTS 7,436,795 B2 * 10/2008 Jiang ..................... H04L 1/1841
370/235
7,522,526 B2 * 4/2009 Yi .......................... H04L 1/1841
370/236

(Continued)

OTHER PUBLICATIONS

International Preliminary Report on Patentability and the Written Opinion of PCT Application No. PCT/SE2014/050186 dated Aug. 16, 2016, 11 pages.

(Continued)

*Primary Examiner* — Tri H Phan
(74) *Attorney, Agent, or Firm* — Sage Patent Group (57) ABSTRACT

A Radio Base Station (RBS) and a method performed by the RBS comprises receiving a frame F1 from a network node, the frame having a sequence number N. If the last received frame F0, prior to the received frame F1, has a sequence number lower than N−1, then starting a first timer T1 having a predefined length in time and temporarily storing the received frame F1. If a subsequent frame F2 having a sequence number lower than N and higher than the sequence number of frame F0 is received, then the received frame F2 is stored. When all frames having a sequence number between the sequence number of frame F0 and N have been received during the predefined length of the first timer T1, then forwarding the stored frames and/or received frames to the UE in the order of the sequence numbers.

24 Claims, 6 Drawing Sheets

(56) References Cited

U.S. PATENT DOCUMENTS

| | | | |
|---|---|---|---|
| 8,018,945 B2 | 9/2011 | Zhang et al. | |
| 8,050,178 B2* | 11/2011 | Yi | H04L 1/1841 370/235 |
| 8,254,259 B2* | 8/2012 | Yi | H04L 1/1841 370/236 |
| 8,279,873 B2* | 10/2012 | Ramos Peres | H04L 1/1841 370/394 |
| 8,400,922 B2* | 3/2013 | Yi | H04L 1/1841 370/235 |
| 8,488,464 B2* | 7/2013 | Lundh | H04L 47/10 370/229 |
| 9,479,966 B2* | 10/2016 | Yi | H04L 1/1841 |
| 2003/0123403 A1 | 7/2003 | Jiang | |
| 2003/0189909 A1 | 10/2003 | Chao et al. | |
| 2005/0135329 A1* | 6/2005 | Lee | H04L 1/1812 370/349 |
| 2007/0042782 A1* | 2/2007 | Lee | H04L 1/1841 455/450 |
| 2007/0233721 A1* | 10/2007 | Bazar | H04L 47/6215 |
| 2008/0002656 A1* | 1/2008 | Lundh | H04L 47/10 370/342 |
| 2008/0209297 A1* | 8/2008 | Chandra | H04L 1/1838 714/748 |
| 2009/0092077 A1* | 4/2009 | Pirskanen | H04L 1/1841 370/328 |
| 2011/0149919 A1* | 6/2011 | Kapoor | H04L 1/1812 370/336 |
| 2012/0082096 A1* | 4/2012 | Cave | H04L 1/1841 370/328 |

OTHER PUBLICATIONS

International Search Report and Written Opinion for Application No. PCT/SE2014/050186, dated Nov. 12, 2014, 16 pages.

Jaiswal S., et al., "Measurement and Classification of Out-of-Sequence Packets in a Tier-1 IP Backbone," IEEE/ACM Transactions on Networking, vol, 15, No. 1, Feb. 2007, pp. 54-66.

TSG Radio Access Network: "High Speed Downlink Packet Access (HSDPA) Overall Description Stage 2 (Release 5) TS 25.308 V5.1.0", Internet Citation, Dec. 2001.

Universal Mobile Telecommunications System (UMTS); High Speed Downlink Packet Access (HSDPA); Overall description; Stage 2 (3GPP TS 25.308 version 11.6.0 Release 11), Technical Specification, European Telecommunications Standards Institute (ETSI), 650, Route Des Lucioles; F-06921 Sophia-Antipolis; France, vol. 3GPP RAN2, No. V11.6.0, Sep. 1, 2013, 78 pages.

Wigren T., "Low Complexity Kalman Filtering for Inter-Cell Interference and Power Based Load Estimation in the WCDMA Uplink," IEEE, 2011, 10 pages.

* cited by examiner

RBS, RNC AND RESPECTIVE METHODS PERFORMED THEREBY FOR TRANSMITTING DATA TO A UE

CROSS-REFERENCE TO RELATED APPLICATIONS

This application is a National stage of International Application No. PCT/SE2014/050186, filed Feb. 14, 2014, which is hereby incorporated by reference.

TECHNICAL FIELD

The present disclosure relates to wireless communication network and in particular to a Radio Base Station, a Radio Network Controller and respective method performed thereby for transmitting data to a User Equipment.

BACKGROUND

In a wireless communication system or wireless communication network, e.g. based on Wideband Code Division Multiple Access, WCDMA, the Radio Network, RN, typically comprises of one or more Radio Network Controllers, RNCs, each connected to one or more Radio Base Stations, RBSs, where the latter are responsible for transmitting data over the air interface. For High Speed Downlink Packet Access, HSDPA, packet data is sent via a Transport Network, TN, between these nodes. For HSDPA the TN is either Asynchronous Transfer Mode, ATM, or Internet Protocol, IP, based.

In the latter case, there may be a chance that the ordering of the packets received at the destination is different from that which the sender generated. This means that data arrives Out Of Sequence, OOS, in the RBS.

In self-built or leased backhaul, an operator has good control over the transport solution and OOS may not be expected. However, this is not the case in Heterogeneous Network, Hetnet, deployments where the operator might use public Internet Service Provider, ISP, network(s) for connecting RBSs.

There are different causes for OOS like packet-level load sharing, route fluttering, router forwarding lulls, parallel processing in routers, improper configuration, and/or faulty software, etc.

Packet-level load sharing: if links have same link weights to the destination, a router equally splits the traffic among these routers.

Route fluttering: forwarding path to a certain destination oscillates among a set of available routes to that destination.

Router forwarding lulls: some routers may pause its forwarding activity for buffered packets, e.g. when they process a routing update. These buffered packets are interspersed with new arrivals, thus causing packet reordering.

If data is received OOS in RBS and no attempt to correct this is done before data is further processed or conveyed to higher layers in a User Equipment, UE, then a number of negative impacts may be expected. These are OOS delivery of messages to higher layers in UE, unnecessary Radio Link Control, RLC, Acknowledged Mode, AM, retransmissions and erroneous decisions for TN Flow Control, FC.

SUMMARY

The object is to obviate at least some of the problems outlined above. In particular, it is an object to provide an RBS and a method performed by the RBS for transmitting data to a UE, the RBS receiving frames from a network node by means of an RLC protocol. It is further an object to provide an RNC and a method performed by the RNC for transmitting data to a UE, via an RBS employing a transport protocol, the RNC transmitting data by a series of frames to the RBS to be forwarded to the UE. These objects and others may be obtained by providing an RBS and an RNC and a respective method performed by an RBS and an RNC according to the independent claims attached below.

According to an aspect a method performed by an RBS for transmitting data to a UE, the RBS receiving frames from a network node by means of an RLC protocol is provided. The method comprises receiving a frame F1 from the network node, the frame having a sequence number, N. If the last received frame F0, prior to the received frame F1, has a sequence number lower than N−1, then the method comprises starting a first timer T1 having a predefined length in time and temporarily storing the received frame F1. If a subsequent frame F2 having a sequence number lower than N and higher than the sequence number of frame F0 is received, then the received frame F2 is stored. When all frames having sequence number between the sequence number of frame F0 and N have been received during the predefined length of the first timer T1, then the method comprises forwarding the stored frames and/or received frames to the UE in the order of the sequence numbers.

According to an aspect, an RBS adapted for transmitting data to a UE, the RBS receiving frames from a network node by means of an RLC protocol is provided. The RBS comprises a processor and a memory, the memory comprising instructions which when executed by the processor causes the RBS to receive a frame F1 from the network node, the frame having a sequence number, N. The memory further comprises instructions which when executed by the processor causes the RBS to start a first timer T1 having a predefined length in time and temporarily store the received frame F1, if the last received frame F0, prior to the received frame F1, has a sequence number lower than N−1; and if receiving a subsequent frame F2 having a sequence number lower than N and higher than the sequence number of frame F0, then to store the received frame F2. The memory further comprises instructions which when executed by the processor causes the RBS to forward the stored frames and/or received frames to the UE in the order of the sequence numbers, when all frames having sequence number between the sequence number of frame F0 and N have been received during the predefined length of the first timer T1, then to forward the stored frames and/or received frames to the UE in the order of the sequence numbers.

The RBS and the method performed thereby may have several advantages. One possible advantage is that frames may be delivered in the correct sequence order and a possible OOS may be avoided. The method, or RBS functionality, has no impact on other nodes or entities than the RBS, hence only a software update of the RBS is required to upgrade the RBS. The method and the RBS may simplify the use of e.g. IP based solutions for the traffic network, which may be of particular importance for Hetnet solutions.

According to an aspect, a method performed by the RNC for transmitting data to a UE, via a RBS employing a transport protocol, the RNC transmitting data by a series of frames to the RBS to be forwarded to the UE is provided. The method comprises comprising receiving a notification from the RBS indicating that an Out Of Sequence has occurred for the series of frames; increasing a frame size in order to reduce the number of frames; and transmitting the data using the increased frame size.

According to an aspect, an RNC adapted for transmitting data to a UE, via a RBS employing a transport protocol, the RNC transmitting data by a series of frames to the RBS to be forwarded to the UE is provided. The RNC comprises a processor and a memory, the memory comprising instructions which when executed by the processor causes the RNC to receive a notification from the RBS indicating that an Out Of Sequence has occurred for the series of frames; to increase a frame size in order to reduce the number of frames; and to transmit the data using the increased frame size.

The RNC and the method performed thereby may have several advantages. One possible advantage is that frames may be delivered in the correct sequence order and a possible OOS may be avoided. The RBS functionality has no impact on other nodes or entities than the RBS, hence only a software update of the RBS is required to upgrade the RBS. The RBS may simplify the use of e.g. internet grade IP based solutions for the transport network, which may be of particular importance for Hetnet solutions.

BRIEF DESCRIPTION OF DRAWINGS

Embodiments will now be described in more detail in relation to the accompanying drawings, in which.

DETAILED DESCRIPTION

Briefly described, an RBS and a method performed by the RBS for transmitting data to a UE, the RBS receiving frames from a network node by means of a Radio Link Control, RLC, protocol, are provided. Further an RNC and a method performed by the RNC for transmitting data to a UE via a, RBS employing a transport protocol, the RNC transmitting data by a series of frames to the RBS to be forwarded to the UE, are provided.

In the case of data being transmitted with RLC Unacknowledged Mode, there is the risk that data delivered to higher layers in UE carried over channels such as Common Control Channel, CCCH, Dedicated Control Channel, DCCH, and Dedicated Traffic Channel, DTCH, etc. may arrive OOS since the 3rd Generation Partnership Project, 3GPP RLC protocol specification only specifies re-ordering for the Multicast Control Channel, MCCH, and Multicast Traffic Channel, MTCH. This could lead to higher layer protocol errors since higher layers such as RRC are sensitive to the order in which messages are received and consequently rely on RLC delivering data in sequence.

In the case of data being transmitted with RLC acknowledged mode there is little risk of OOS delivery, unless this has been explicitly configured, to higher layers. However, there is a risk of unnecessary RLC retransmissions since the receiving RLC entity will immediately trigger the transmission of an RLC status report, unless delayed by the RLC status prohibit timer, requesting retransmissions if missing RLC acknowledged mode data is detected.

Consequently, if data is conveyed from the RBS to the RLC layer in UE, OOS may result in an unnecessary load on both the TN and radio interface since additional redundant copies of RLC acknowledged mode data will be sent for data which was merely delayed, not lost.

There may also be a negative impact on downlink Flow Control, FC, or Active Queue Management, AQM, functions since some FC and AQM schemes rely on monitoring Iub frame losses to detect sign of TN congestion. Some of these schemes will consequently react on missing frame Sequence Number, SN, as a sign of losses and interpret this as congestion and erroneously indicate congestion to these mechanisms thereby leading to an unwanted restriction of the data sent in TN.

Embodiments of a method performed by an RBS for transmitting data to a UE, the RBS receiving frames from a network node by means of an RLC protocol, will now be described with reference to FIGS. 1a-1c.

Figure 1A:
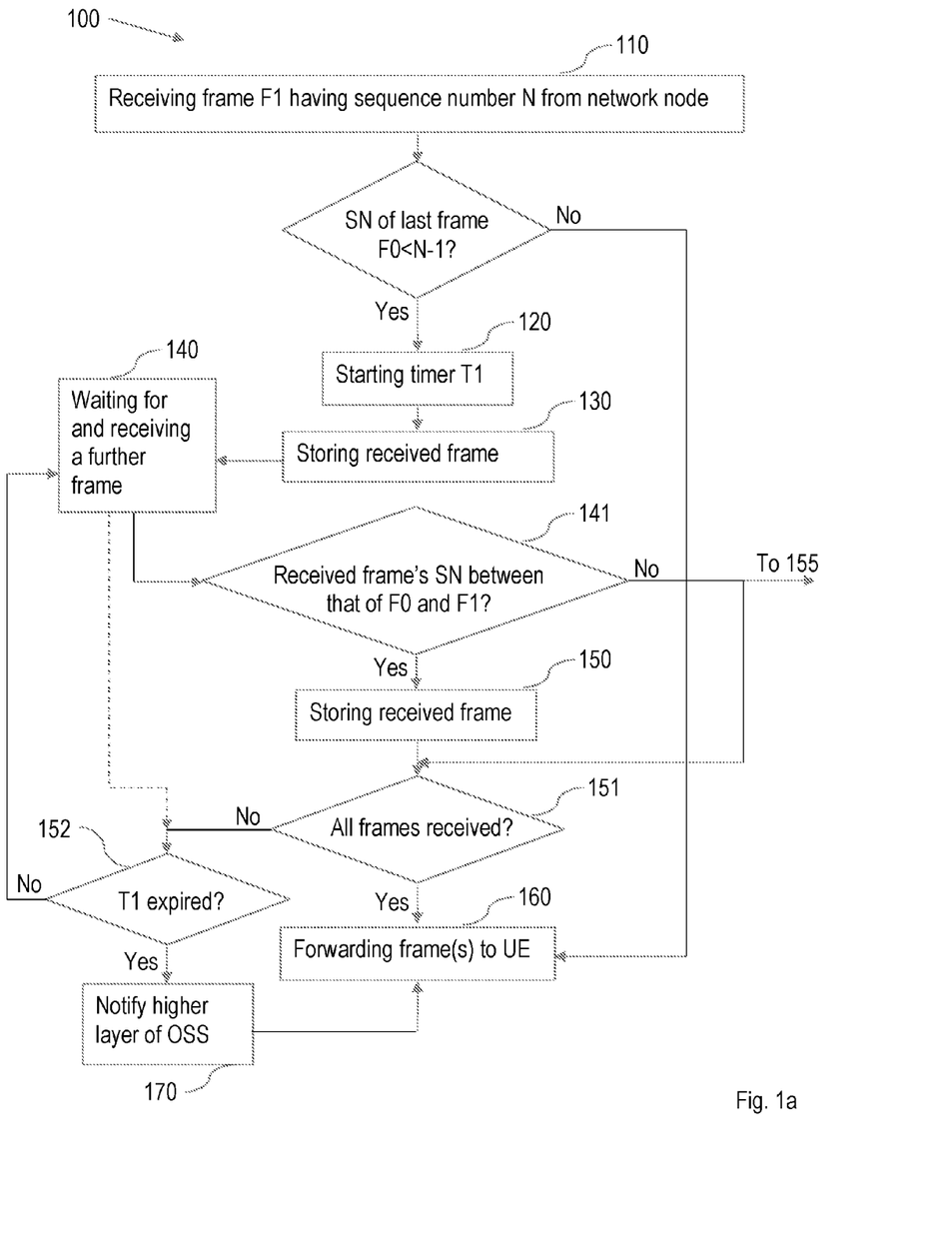
FIG. 1a is a flowchart of a method performed by an RBS for transmitting data to a UE, according to an exemplifying embodiment.

FIG. 1a illustrates the method comprising receiving 110 a frame F1 from the network node, the frame having a sequence number, N. If the last received frame F0, prior to the received frame F1, has a sequence number lower than N−1, then the method comprises starting 120 a first timer T1 having a predefined length in time and temporarily storing 130 the received frame F1. If a subsequent frame F2 having a sequence number lower than N and higher than the sequence number of frame F0 is received 140, then the received frame F2 is stored 150. When all frames having sequence number between the sequence number of frame F0 and N have been received during the predefined length of the first timer T1, then the method comprises forwarding 160 the stored frames and/or received frames to the UE in the order of the sequence numbers.

The RBS may receive one or more sequences comprising a plurality of frames from the network node to be forwarded to the UE. A sequence of frames comprises frames having individual sequence numbers, SNs.

As illustrated in FIG. 1a, for a sequence of frames, the RBS receives a frame referred to as F1. Prior to receiving the frame F1, the RBS has received a frame referred to as F0. The RBS compares the sequence number of F1 and the sequence number of F0. The sequence number of F1 is referred to as N. If frame F1 is received in sequence with F0, then the sequence number of F0 is 1 less than the sequence number of F1. Thus, if the sequence number of F1 is N then the sequence number of F0 is N−1. Looking at FIG. 1a, if this is the case, then the frame, F1, is forwarded to the UE in step 160.

However, in case an out of sequence, OSS, situation has occurred, then there is at least one frame missing between F0 and F1. In other words, the sequence number of F0 is lower than N−1. If this is the case, then the first timer T1 is started in step 120. T1 has a predefined length so it will run for a predetermined period of time. The RBS then stores the received frame F1 and waits for the frame, or frames, that are missing.

In step 140, the RBS receives a further, or next, frame. Here it is assumed that the timer T1 is still running. Should the timer T1 expire before the next frame is received, then other measures are taken which will be explained in more detail below. Once the RBS receives the further, or next, frame in step 140, the RBS checks that the sequence number of this received frame is between the sequence number of F0 and F1. This is because since there is at least one frame missing between F0 and F1, since the sequence number of F0 is less than N−1.

If this condition is fulfilled, then the received frame is stored in step 150 and the RBS checks if all frames have been received, i.e. all frames between F0 and F1. If they have, then the RBS forwards the frames to the UE in the order of the sequence numbers. For example, if there was just one frame missing, FX, between frame F0 and F1, then the RBS forwards the frames to the UE in the order of the sequence numbers, F0, FX and F1. The RBS may also here stop the timer T1. Should the condition in 141 not be fulfilled, i.e. the sequence number of FX not be between the sequence numbers of F0 and F1, then other measures are taken which will be explained in more detail below.

In case not all frames are received, i.e. there are at least two frames missing between F0 and F1, then the RBS waits to receive yet a further, or next, frame and receives it in step 140. Then the same procedure is repeated with step 141, 150, 151 is repeated as described above. If all frames are received now, then the frames are forwarded to the UE as described above, or, if T1 has not expired, then the RBS again waits to receive a further, or next, frame.

The RLC protocol may operate in acknowledged mode, unacknowledged mode or transparent mode.

The method performed by the RBS may have several advantages. One possible advantage is that frames may be delivered in the correct sequence order and a possible OOS may be avoided. The method has no impact on other nodes or entities than the RBS, hence only a software update of the RBS is required to upgrade the RBS. The method may simplify the use of e.g. IP based solutions for the traffic network, which may be of particular importance for Hetnet solutions.

The network node may be a Radio Network Controller, RNC, and wherein the RBS and the RNC are operative to be employed in a Wideband Code Division Multiple Access, WCDMA, communication network.

There are several techniques for wireless communication networks, e.g. Global System for Mobile communications, GSM, employing a Time Division Multiple Access, TDMA, solution for the radio access, Universal Mobile Telecommunication System, UMTS, employing WCDMA and Long Term Evolution, LTE, employing Orthogonal Frequency Division Multiplexing. The network node from which the RBS receives frames to be forwarded to the UE may be an RNC, wherein the RBS and the RNC are operative to be employed in a WCDMA communication network.

The method may further comprise, if the first timer T1 expired before all frames having sequence number between the sequence number of frame F0 and N were received, notifying 170 higher layer of a communication network in which the RBS is employed informing that an Out Of Sequence, OSS, situation has occurred.

It may happen that not all frames are received until the timer T1 expires. For example, after frame F1 has been received, T1 is started in step 120 and frame F1 is stored in 130. Then the in 140, the RBS waits to receive a further frame. If a further frame is received, then the RBS checks the sequence number of the received frame against the sequence number of F1 and F0 as described above. However, T1 may expire while the RBS is waiting to receive a further frame in 140. If so, the RBS notifies higher layer of the communication network, in step 170, that the OOS situation has occurred. This scenario is indicated in FIG. 1a with the dotted line between box 140 and 152. This may happen if the missing frame or frames are permanently lost, or if they are delay to an extent so that T1 expires before all missing frames are received.

The method may further comprise forwarding 160 the stored frames and/or received frames to the UE.

Even if not all frames have been received before T1 expires as described above, the RBS may still forward the frames it has received to the UE, preferably in the of the sequence numbers. In this manner, the RBS leaves it up to the UE to deal with the fact that it does not receive all frames. The UE may for example send ACKs for received frames and/or send negative ACKs, NACKs, for frames not received. Whatever action the UE may take upon the reception of only parts of the frames of a sequence, is of no concern for the method performed by the RBS.

The method may further comprise receiving 155 a frame F3 from the network node having a sequence number higher than N+1 during the duration of the first timer T1, starting 180 a second timer T2 having a predefined length in time and storing 190 the received frame having sequence number higher than N in the memory.

During the running of T1, the RBS may receive a further frame, F3, in step 140 having a sequence number not between the sequence number of F0 and F1. In step 141 of FIG. 1a, this results in checking if the sequence number of F3 is just one above the sequence number of F1 or more than one above. Looking at FIG. 1b, the RBS checks if the sequence number of the received further frame, F3, is higher than N+1. If so, it means that there are frame missing between F1 and the received further frame, F3.

Merely as an example, assume that the RBS first receives a frame having sequence number 1 from the RNC. In step 110, since it is the first frame of the sequence, the frame is forwarded to the UE in step 160. Then the next frame to be received in step 110 has sequence number 2. Thus also this frame is forwarded to the UE. Next, a further frame having sequence number 3 is received and is forwarded to the UE. Thereafter, frame 6 is received, i.e. a frame having sequence number 6. In this example, F0 is frame 3, i.e. the frame having sequence number 3 and frame F1 is frame 6. Since 3<6-1, the first timer T1 is started in 120 and the frame is stored in 130. The RBS is waiting to receive a further frame and received the further frame in 140. In this example, the received frame is referred to as F3 and has sequence number 8. In step 141, it is concluded that 8 is not between 3 and 6, and hence in step 155, in FIG. 1b, it is checked if 8>6+1. I.e. is sequence number of F3 (8) higher than sequence number of F1 (6)+1. Since this is true, a second timer T2 is started in step 180. The second timer T2 is thus associated with the missing frame between F1 and F3, which in this example is the frame having sequence number 7. Then the received frame, F3, having sequence number 8 is stored in step 190.

Figure 1B:
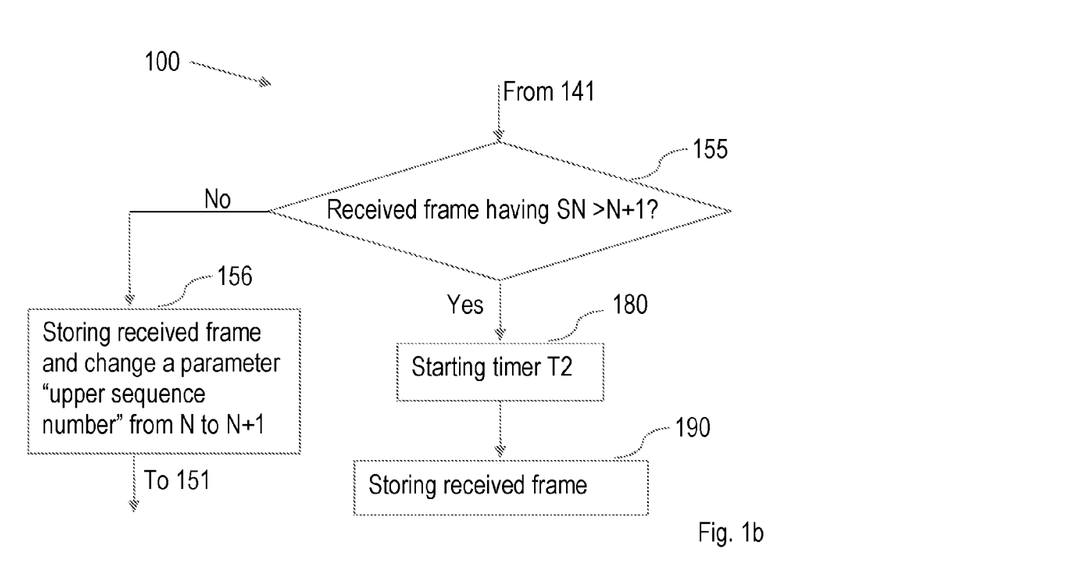
FIG. 1b is a flowchart of a method performed by an RBS for transmitting data to a UE, according to yet an exemplifying embodiment.

FIG. 1b does not illustrate what happens thereafter. However, There will be a similar "process" associated with timer T2 as with timer T1 described above. In other words, during the duration of T2, the RBS will wait to receive a further frame, in this process associated with timer T2, the further frame is frame 7, i.e. the frame having sequence number 7.

Consequently, there may be more than one timer running, or processes running, concurrently.

According to an example, the method may comprise starting more than two timers T1 and T2. For example, during the running of timer T2, a frame is received out of sequence with regards to the frames associated with timer T2. Then a timer T3 may be started in the same manner as for timers T1 and T2. Alternatively, the RBS may choose to not have more than two timers running at the same time so that if a frame is received out of sequence with regards to the frames associated with timer T2, then either T1 is stopped and T3 is started and the OSS situation reported to higher layers, T2 is stopped and T3 is started and the OSS situation reported to higher layers or no further timer, i.e. T3 is not started and T1 and T2 are left running and the OSS situation reported to higher layers.

The method may further comprise receiving 155 a frame F3 from the network node having a sequence number equal to N+1 during the duration of the first timer T1, storing 156 the received frame F3 and updating a parameter, upper sequence number, from N to N+1, wherein if receiving a further frame, the sequence number of the received further frame is checked if being between the sequence number of frame F0 and N+1.

In case the received frame, F3 has sequence number equal to N+1, then frame F3 is in sequence with F1, meaning there are no frames missing between frame F1 and F3. Thus, the parameter upper sequence number is updated from having the sequence number of F1 to having the sequence number of F3. The parameter upper sequence number is used in step 141, when checking whether a further received frame has sequence number between F0 and F1. Since F1 has sequence number N, the parameter upper sequence number has the value N. However, if frame F3 is in sequence with F1, then the parameter upper sequence number is updated to N+1.

Reverting to the above example, wherein frames 1, 2 and 3 are received in sequence and then frame 8 is received. By frame 1, 2, 3 and 6 is meant the frames having sequence number 1, 2, 3 and 6 respectively. When in step 140 waiting to receive a further frame and receiving frame F3 having sequence number 7, thus also being referred to as frame 7, the RBS checks in step 141 if 7 is between 3 and 6. Since it is not, the RBS checks in step 155 if 7 is 6+1. Since this is true, the RBS stored the receive frame 7, i.e. F3, and changes, or updates the parameter upper sequence number from 6 to 7. This means that now frames 1, 2, 3, 6 and 7 have been received and in step 151 it is ascertained that not all frames have been received since 4 and 5 are still missing. The RBS further ascertains that the timer T1 is still running and then waits to receive a further frame and receives a further frame in 140. Assume this further frame has sequence number 4. The RBS checks, in step 141 is 7 is between 3 and 7 (not 6 since the RBS uses the parameter upper sequence number which has just been updated to 7). Since this is true, the RBS stores the frame in step 150, checks in all frames have been received in step 151. Since the RBS is still missing frame 5, the RBS checks in T1 is still running and if so, waits for a further frame in step 140.

Still further, the method may comprise determining 111 the number of missing frames based on the sequence number of frame F0 and F1, and starting 121 a respective timer T1 for each missing frame.

In this embodiment, instead of starting one timer T1 for at least one missing frame, even if there are many frames missing, the RBS starts one timer T1 for each missing frame.

Figure 1C:
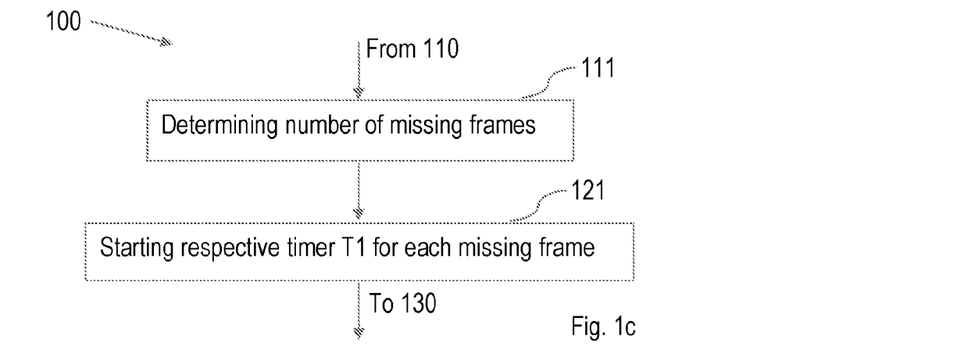
FIG. 1c is a flowchart of a method performed by an RBS for transmitting data to a UE, according to still an exemplifying embodiment.

Reverting again to the example above, assume the RBS has received frames 1, 2 and 3 when frame 6 is received in step 110, FIG. 1c illustrates that the RBS determines the number of missing frame, step 111, in the above example, frames 4 and 5 are missing. Thus, the RBS starts two respective timers T1 in step 121, one timer T1 for frame 4 and one timer T1 for frame 5. In this manner, two parallel processes are running for each respective missing frame. So in FIG. 1c, "To 130" indicates that the next method step is 130, storing the received frame, i.e. frame 6. Then the RBS waits to receive a further frame in step 140, the further frame being 4 or 5 in this example. When the further frame is received, the RBS checks in step 141 if the frame number of the received frame is 4 or 5. If so, e.g. the received frame has sequence number 4, then the frame is stored in step 150 and the timer T1 associated with frame 4 is stopped (not shown in FIG. 1a) and the RBS checks in step 151 if all frames are received, which is not the case so far and thus the RBS checks if any timer T1 is still running. Since timer T1 associated with frame 5 is still running, then the RBS waits to receive a further frame in step 140. Assume further in this example that the RBS receives frame 5 and then checks in step 141 if the sequence number, being 5, is between 3 and 6. Since this is true the RBS then checks if all frames have been received in step 151, which is true and then the RBS forwards to the UE in the order of the sequence numbers, i.e. 1, 2, 3, 4, 5 and 6.

It shall be pointed out that the RBS may receive a frame having sequence number higher than 6 in the example above, wherein the RBS checks if the received frame has a sequence number higher than N+1 (i.e. higher than 7 following the example above). If so, the actions according to steps 156 or 180 are taken as described above, also in the embodiment of having a respective timer T1 for each missing frame.

The predefined value of the first and the second timer T1 and T2 may be hard coded into the RBS.

The values of T1 and T2 may be hard coded into the RBS meaning e.g. that they are pre-programmed into the RBS upon manufacturing of the RBS. They may also be hard coded into the RBS by meaning of being defined upon installation of the RBS into the wireless network. T1 and T2 may have the same value or they may have different values.

The predefined value of at least one of the first and the second timer T1 and T2 may dynamically determined.

Alternatively, the respective value of T1 and T1 may be dynamically determined based on e.g. different characteristics of the communication network, traffic situation, load situation, interference situation and so on. They may be set e.g. in an RNC or in a Operation, Administration and Maintenance, OAM, node and signalled to the RBS.

The timers T1 and T2 may e.g. be gradually increased with an increasing delay for OSS delivered data.

The value of at least one of the timers T1 and T2 may be determined based on delay characteristics of the received frames and/or traffic network statistics.

There different factors that may be relevant for the determination of the length of T1 and T1. One example is delay characteristics of the received frames. If there is a relatively large delay of the received frames, then the length of timers T1 and T2 may be relatively long compared to a situation wherein there is a relatively short delay of the received frames, wherein the length of timers T1 and T2 may be relatively short. Another example is traffic network statistics.

In case there is a relatively high load in the communication network, or on the RBS itself, the length of T1 and T2 may be relatively long compared to a situation wherein there is a relatively low load in the communication network, or on the RBS itself, wherein the length of T1 and T2 may be relatively short.

Still further, the method may be performed per Radio Access Bearer, RAB, or Priority Queue, PQ.

An RBS may have a plurality of RABs set up and a plurality of PQs. If the RBS has more than one RAB set up, then the method may be performed per RAB. Further, if there is more than one PQ, then the method may be performed per PQ. Further, there may be more than one PQ per RAB. The length of the different timers, T1 and T2 may be the same or different for individual RABs and/or PQs.

The method may further comprise decoding Media Access Control Packet Data Unit, MAC-d PDU of received frames to deduce RLC sequence number comprised therein and determining that an OSS situation has occurred based on the RLC sequence number.

Instead of, or complementary to, looking at the sequence numbers of the received frames, the RBS may decode the MAC-d PDU of received frames. In this manner, the RBS is enabled to read, or deduce, the RLC sequence number information contained in these to determine the correct order to send these MAC-d PDUs to the UE.

Embodiments herein also relate to a method performed by a Radio Network Controller, RNC, for transmitting data to a UE, via a RBS employing a transport protocol, the RNC transmitting data by a series of frames to the RBS to be forwarded to the UE. Embodiments of such a method will now be described with reference to FIG. 2.

Figure 2:
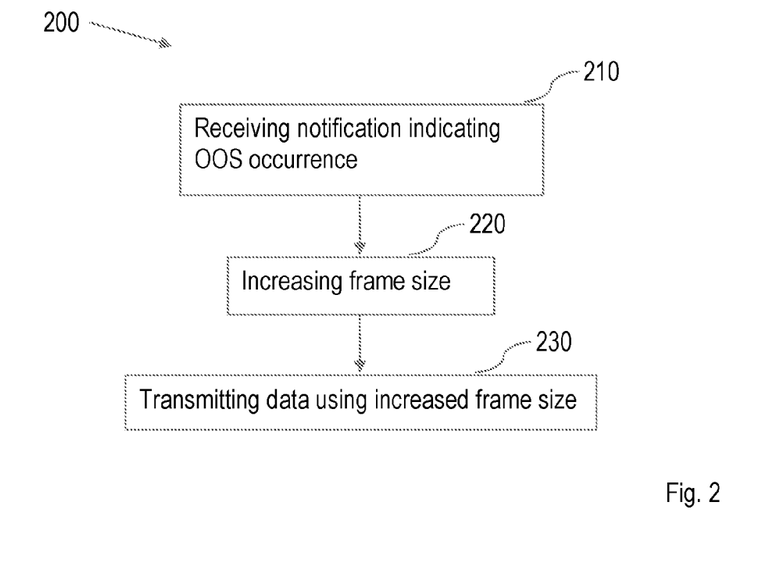
FIG. 2 is a flowchart of a method performed by an RNC for transmitting data to a UE, according to an exemplifying embodiment.

FIG. 2 illustrates the method comprising receiving 210 a notification from the RBS indicating that an Out Of Sequence has occurred for the series of frames; increasing 220 a frame size in order to reduce the number of frames; and transmitting 230 the data using the increased frame size.

If the RBS determines that an OSS has occurred, the RBS may notify higher layers thereof as described above. The reason for the OSS may be associated to different circumstances, e.g. high load. In order to increase the probability of successful transmission of the data to the RBS, the RNC increases the frame size in order to reduce the number of frames. It may be that instead of sending a plurality of different small frames, wherein one or two frames are lost, a few larger frames may be more probable to reach the RBS. Thus the RNC increases the frame size and then transmits the data to the RBS using the increased frame size.

The method performed by the RNC may have several advantages. One possible advantage is that the probability of OSS occurring may be reduced and then the frames may be delivered in the correct sequence order and a possible OOS may be avoided. The method may simplify the use of e.g. internet grade IP based solutions for the transport network, which may be of particular importance for Hetnet solutions.

The UE may further be mandated for HSDPA channels, wherein the UE performs the re-ordering of received frames. The UE may implement the method above, wherein the UE detects at least one missing frame and then temporarily stores last received frame, starts a timer, and waits to receive the missing frame or frames. The UE does not encode or read the frames until all frames in the sequence are received.

Embodiments herein also relate to a RBS adapted for transmitting data to a UE, the RBS receiving frames from a network node by means of an RLC protocol. The RBS has the same objects, technical features and advantages as the method performed by the RBS as described above. The RBS will hence on be described in brief in order to avoid unnecessary repetition.

Figure 3:
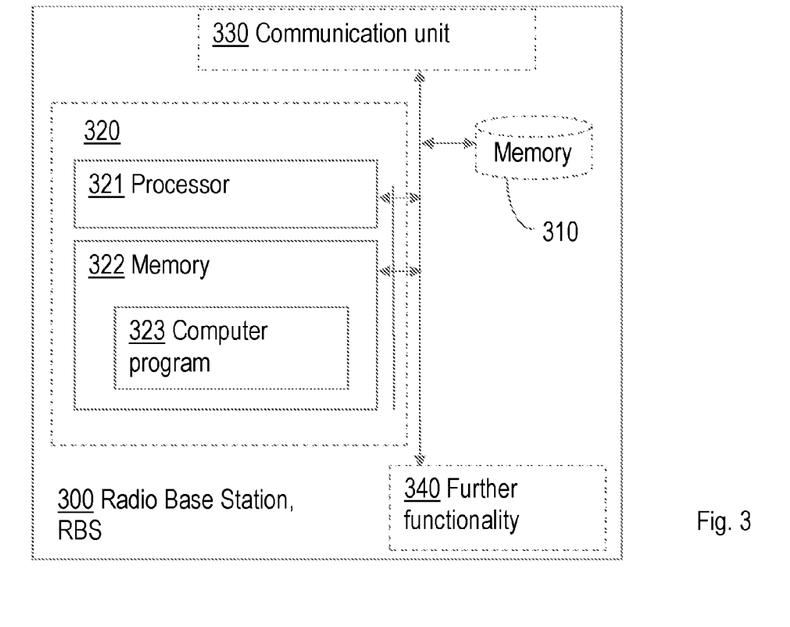
FIG. 3 is a block diagram of an RBS adapted for transmitting data to a UE, according to an exemplifying embodiment.

FIG. 3 is a block diagram of an RBS adapted for transmitting data to a UE, according to an exemplifying embodiment. FIG. 3 illustrates the RBS 300 comprising a processor 321 and a memory 322, the memory comprising instructions which when executed by the processor causes the RBS 300 to receive a frame F1 from the network node, the frame having a sequence number, N. The memory further comprises instructions which when executed by the processor causes the RBS 300 to start a first timer T1 having a predefined length in time and temporarily store the received frame F1, if the last received frame F0, prior to the received frame F1, has a sequence number lower than N−1; and if receiving a subsequent frame F2 having a sequence number lower than N and higher than the sequence number of frame F0, then to store the received frame F2. The memory further comprises instructions which when executed by the processor causes the RBS to forward the stored frames and/or received frames to the UE in the order of the sequence numbers, when all frames having sequence number between the sequence number of frame F0 and N have been received during the predefined length of the first timer T1.

The RBS has the same possible advantages as the method performed by the RBS. One possible advantage is that frames may be delivered in the correct sequence order and a possible OOS may be avoided. The RBS functionality has no impact on other nodes or entities than the RBS, hence only a software update of the RBS is required to upgrade the RBS. The RBS may simplify the use of e.g. IP based solutions for the traffic network, which may be of particular importance for Hetnet solutions.

The network node may be an RNC, and wherein the RBS and the RNC are operative to be employed in a WCDMA communication network.

According to an embodiment, the memory 322 further comprises instructions which when executed by the processor 321 causes the RBS 300 to, if the first timer T1 expired before all frames having sequence number between the sequence number of frame F0 and N were received, notify higher layer of a communication network in which the RBS is employed informing that an Out Of Sequence, OSS, situation has occurred.

According to still an embodiment, the memory 322 further comprises instructions which when executed by the processor 321 causes the RBS 300 to forward the stored frames and/or received frames to the UE.

The memory 322 may further comprise instructions which when executed by the processor 321 causes the RBS 300 to receive a frame F3 from the network node having a sequence number higher than N+1 during the duration of the first timer T1, to start a second timer T2 having a predefined length in time and to store the received frame having sequence number higher than N in the memory.

According to an embodiment, the memory 322 further comprises instructions which when executed by the processor 321 causes the RBS 300 to receive a frame F3 from the network node having a sequence number equal to N+1 during the duration of the first timer T1, to store the received frame F3 and updating a parameter, upper sequence number, from N to N+1, wherein if receiving a further frame, the sequence number of the received further frame is checked if being between the sequence number of frame F0 and N+1.

The memory 322 may still further comprise instructions which when executed by the processor 321 causes the RBS 300 to determine the number of missing frames based on the sequence number of frame F0 and F1, and to start a respective timer T1 for each missing frame.

The predefined value of the first and the second timer T1 and T2 may be hard coded into the RBS.

The predefined value of at least one of the first and the second timer T1 and T2 may be dynamically determined.

The value of at least one of the timers T1 and T2 may be determined based on delay characteristics of the received frames and/or traffic network statistics.

The RBS may further be adapted to perform the method per Radio Access Bearer or Priority Queue.

According to an embodiment, the memory 322 further comprises instructions which when executed by the processor 321 causes the RBS 300 to decode MAC-d PDU of received frames to deduce RLC sequence number comprised therein and to determine that an OSS situation has occurred based on the RLC sequence number.

Embodiments herein also relate to a RNC adapted for transmitting data to a UE, via a RBS employing a transport protocol, the RNC transmitting data by a series of frames to the RBS to be forwarded to the UE. The RNC has the same objects, technical features and advantages as the method performed by the RNC as described above. The RNC will hence on be described in brief in order to avoid unnecessary repetition.

Figure 4:
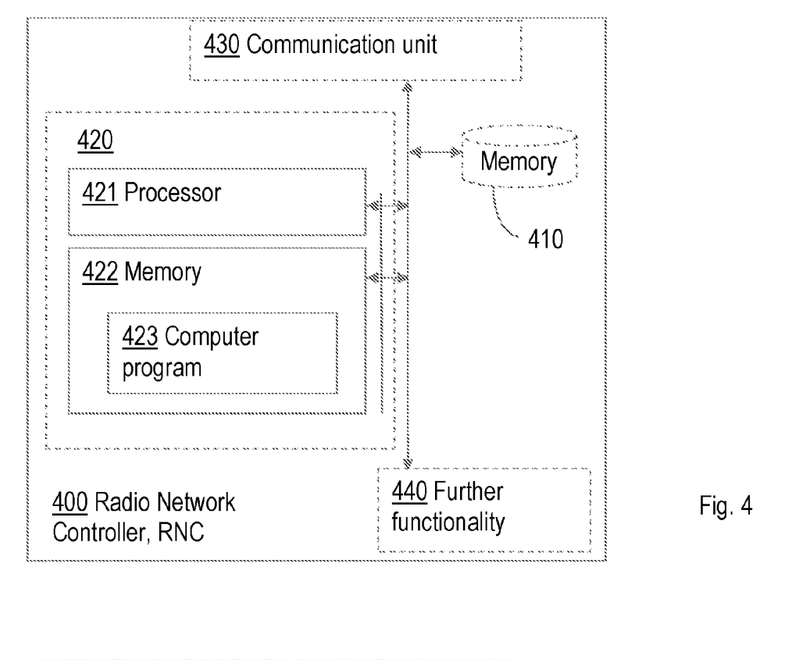
FIG. 4 is a block diagram of an RNC adapted for transmitting data to a UE, according to an exemplifying embodiment.

FIG. 4 is a block diagram of an RNC 400 adapted for transmitting data to a UE, according to an exemplifying embodiment. FIG. 4 illustrates the RNC comprising a processor 421 and a memory 422, the memory comprising instructions which when executed by the processor causes the RNC 400 to receive a notification from the RBS indicating that an Out Of Sequence has occurred for the series of frames; to increase a frame size in order to reduce the number of frames; and to transmit the data using the increased frame size.

The RNC has the same possible advantages as the method performed by the RNC may have several advantages. One possible advantage is that the probability of OSS occurring may be reduced and then the frames may be delivered in the correct sequence order and a possible OOS may be avoided. The RNC may simplify the use of e.g. internet grade IP based solutions for the transport network, which may be of particular importance for Hetnet solutions.

Embodiments herein also relate to a RBS for transmitting data to a UE, the RBS receiving frames from a network node by means of an RLC protocol. The RBS has the same objects, technical features and advantages as the method performed by the RBS as described above and the RBS described above in conjunction with FIG. 3. The RBS will hence on be described in brief in order to avoid unnecessary repetition.

Figure 5:
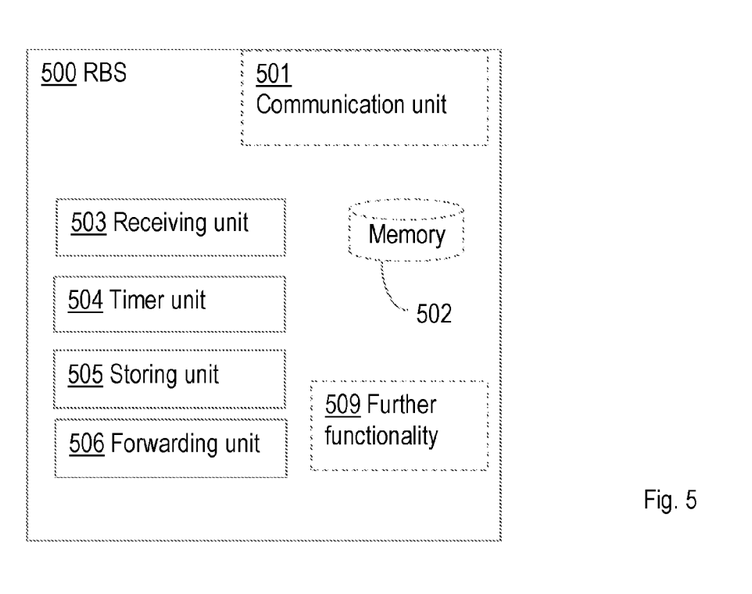
FIG. 5 is a block diagram of an RBS for transmitting data to a UE, according to an exemplifying embodiment.

FIG. 5 is a block diagram of an RBS for transmitting data to a UE, according to an exemplifying embodiment. FIG. 5 illustrates the RBS 500 comprising a receiving unit 503 for receiving a frame F1 from the network node, the frame having a sequence number, N; and a timer unit (504) and a storing unit 505 for, if the last received frame F0, prior to the received frame F1, has a sequence number lower than N−1, then starting a first timer T1 having a predefined length in time and temporarily storing the received frame F1. If a subsequent frame F2 having a sequence number lower than N and higher than the sequence number of frame F0 is received, then the received frame F2 is stored by means of the storing unit 505. The RBS further comprises a forwarding unit 506 for, when all frames having sequence number between the sequence number of frame F0 and N have been received during the predefined length of the first timer T1, then forwarding the stored frames and/or received frames to the UE in the order of the sequence numbers.

The RBS has the same possible advantages as the method performed by the RBS as described above and the RBS described above in conjunction with FIG. 3. One possible advantage is that frames may be delivered in the correct sequence order and a possible OOS may be avoided. The RBS functionality has no impact on other nodes or entities than the RBS, hence only a software update of the RBS is required to upgrade the RBS. The RBS may simplify the use of e.g. IP based solutions for the traffic network, which may be of particular importance for Hetnet solutions.

In FIG. 5, the network RBS 500 is also illustrated comprising a communication unit 501. Through this unit, the RBS 500 is adapted to communicate with other nodes and/or entities in the wireless communication network. The communication unit 501 may comprise more than one receiving arrangement. For example, the communication unit 501 may be connected to both a wire and an antenna, by means of which the RBS 500 is enabled to communicate with other nodes and/or entities in the wireless communication network. Similarly, the communication unit 501 may comprise more than one transmitting arrangement, which in turn are connected to both a wire and an antenna, by means of which the RBS 500 is enabled to communicate with other nodes and/or entities in the wireless communication network. The RBS 500 further comprises a memory 502 for storing data. Further, the RBS 500 may comprise a control or processing unit (not shown) which in turn is connected to the different units 503-506. It shall be pointed out that this is merely an illustrative example and the network node 500 may comprise more, less or other units or modules which execute the functions of the network node. The RBS 500 is further illustrated comprising further functionality 509. This functionality may be related to other features and/or function of the RBS necessary for the RBS to perform other tasks, for example a scheduler for scheduling UE transmission in uplink.

It should be noted that FIG. 5 merely illustrates various functional units in the RBS 500 in a logical sense. The functions in practice may be implemented using any suitable software and hardware means/circuits etc. Thus, the embodiments are generally not limited to the shown structures of the RBS 500 and the functional units. Hence, the previously described exemplary embodiments may be realised in many ways. For example, one embodiment includes a computer-readable medium having instructions stored thereon that are executable by the control or processing unit for executing the method steps in the RBS 500. The instructions executable by the computing system and stored on the computer-readable medium perform the method steps of the RBS 500 as set forth in the claims.

Embodiments herein also relate to a RNC for transmitting data to a UE, via a RBS employing a transport protocol, the RNC transmitting data by a series of frames to the RBS to be forwarded to the UE. The RNC has the same objects, technical features and advantages as the method performed by the RNC as described above and the RNC described above in conjunction with FIG. 4. The RNC will hence on be described in brief in order to avoid unnecessary repetition.

Figure 6:
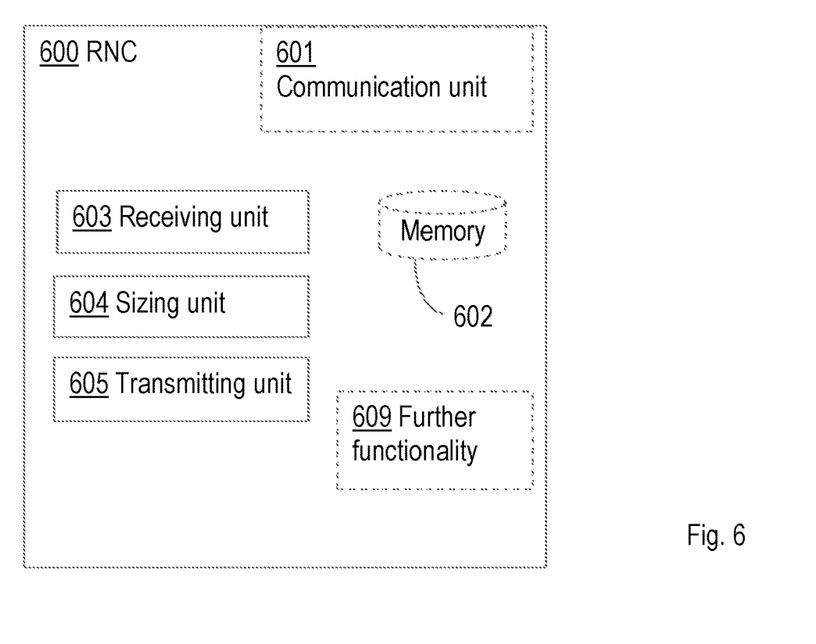
FIG. 6 is a block diagram of an RNC for transmitting data to a UE, according to an exemplifying embodiment.

FIG. 6 is a block diagram of an RNC 600 for transmitting data to a UE, according to an exemplifying embodiment. FIG. 6 illustrates the RNC comprising a receiving unit 603 for receiving a notification from the RBS indicating that an Out Of Sequence has occurred for the series of frames; a sizing unit 604 for increasing a frame size in order to reduce the number of frames; and a transmitting unit 605 for transmitting the data using the increased frame size.

The RNC has the same possible advantages as the method performed by the RNC as described above and the RNC described above in conjunction with FIG. 4. One possible advantage is that the probability of OSS occurring may be reduced and then the frames may be delivered in the correct sequence order and a possible OOS may be avoided. The RNC may simplify the use of e.g. internet grade IP based solutions for the transport network, which may be of particular importance for Hetnet solutions.

In FIG. 6, the RNC 600 is also illustrated comprising a communication unit 601. Through this unit, the RNC 600 is adapted to communicate with other nodes and/or entities in the wireless communication network. The communication unit 601 may comprise more than one receiving arrangement. For example, the communication unit 601 may be connected to both a wire and an antenna, by means of which the RNC 600 is enabled to communicate with other nodes and/or entities in the wireless communication network. Similarly, the communication unit 601 may comprise more than one transmitting arrangement, which in turn are connected to both a wire and an antenna, by means of which the RNC 600 is enabled to communicate with other nodes and/or entities in the wireless communication network. The RNC 600 further comprises a memory 602 for storing data. Further, the RNC 600 may comprise a control or processing unit (not shown) which in turn is connected to the different units 603-604. It shall be pointed out that this is merely an illustrative example and the RNC 600 may comprise more, less or other units or modules which execute the functions of the RNC 600. The RNC 600 is further illustrated comprising further functionality 609. This functionality may be related to other features and/or function of the RNC necessary for the RNC to perform other tasks, e.g. coordinating one or more RBSs.

It should be noted that FIG. 6 merely illustrates various functional units in the RNC 600 in a logical sense. The functions in practice may be implemented using any suitable software and hardware means/circuits etc. Thus, the embodiments are generally not limited to the shown structures of the RNC 600 and the functional units. Hence, the previously described exemplary embodiments may be realised in many ways. For example, one embodiment includes a computer-readable medium having instructions stored thereon that are executable by the control or processing unit for executing the method steps in the RNC 600. The instructions executable by the computing system and stored on the computer-readable medium perform the method steps of the RNC 600 as set forth in the claims.

Figure 7:
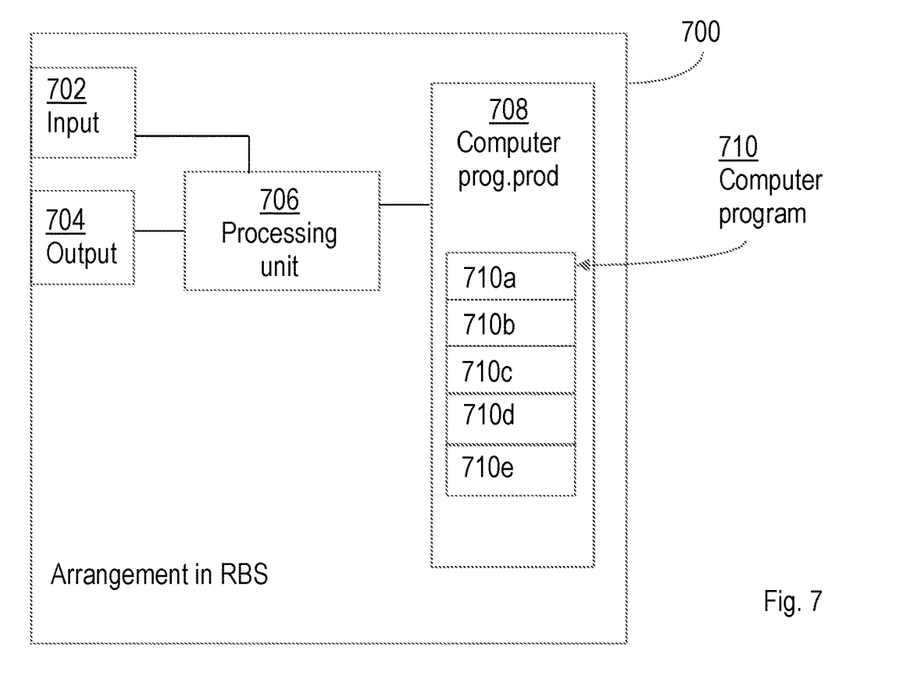
FIG. 7 is a block diagram of an arrangement in an RBS for transmitting data to a UE, according to an exemplifying embodiment.

FIG. 7 schematically shows an embodiment of an arrangement in an RBS 700. Comprised in the arrangement in the RBS 700 are here a processing unit 706, e.g. with a DSP (Digital Signal Processor). The processing unit 706 may be a single unit or a plurality of units to perform different actions of procedures described herein. The arrangement in the RBS 700 may also comprise an input unit 702 for receiving signals from other entities, and an output unit 704 for providing signal(s) to other entities. The input unit and the output unit may be arranged as an integrated entity as illustrated in the example of FIG. 5 and the communication unit 501.

Furthermore, the arrangement in the RBS 700 comprises at least one computer program product 708 in the form of a non-volatile memory, e.g. an EEPROM (Electrically Erasable Programmable Read-Only Memory), a flash memory and a hard drive. The computer program product 708 comprises a computer program 710, which comprises code means, which when executed in the processing unit 706 in the arrangement in the RBS 700 causes RBS to perform the actions e.g. of the procedure described earlier in conjunction with FIGS. 1*a*-1*c*.

The computer program 710 may be configured as a computer program code structured in computer program modules 710*a*-710*e*. Hence, in an exemplifying embodiment, the code means in the computer program of the arrangement in the network node 700 comprises a receiving unit, or module, for receiving a frame F1 from the network node, the frame having a sequence number, N. The computer program may further comprise a timing unit, or module for starting a first timer T1 having a predefined length in time if the last received frame F0, prior to the received frame F1, has a sequence number lower than N−1; and a storing unit, or module, for temporarily storing the received frame F1. If a subsequent frame F2 having a sequence number lower than N and higher than the sequence number of frame F0 is received, then the storing unit, or module, may store the received frame F2. The computer program may further comprise a forwarding unit, or module for forwarding (160) the stored frames and/or received frames to the UE in the order of the sequence numbers when all frames having sequence number between the sequence number of frame F0 and N have been received during the predefined length of the first timer T1.

The computer program modules could essentially perform the actions of the flow illustrated in FIGS. 1*a*-1*c*, to emulate the RBS 500. In other words, when the different computer program modules are executed in the processing unit 706, they may correspond to the units 503-506 of FIG. 5.

Figure 8:
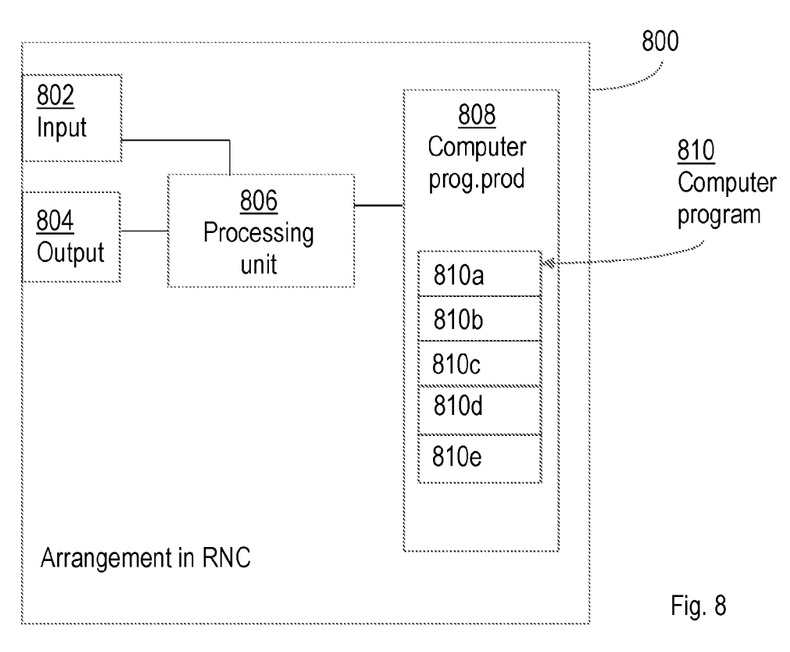
FIG. 8 is a block diagram of an arrangement in an RNC for transmitting data to a UE, according to an exemplifying embodiment.

FIG. 8 schematically shows an embodiment of an arrangement in an RNC. Comprised in the arrangement in the RNC 800 are here a processing unit 806, e.g. with a DSP (Digital Signal Processor). The processing unit 806 may be a single unit or a plurality of units to perform different actions of procedures described herein. The arrangement in the RNC 800 may also comprise an input unit 802 for receiving signals from other entities, and an output unit 804 for providing signal(s) to other entities. The input unit and the output unit may be arranged as an integrated entity as illustrated in the example of FIG. 6 and the communication unit 601.

Furthermore, the arrangement in the RNC 800 comprises at least one computer program product 808 in the form of a non-volatile memory, e.g. an EEPROM (Electrically Erasable Programmable Read-Only Memory), a flash memory and a hard drive. The computer program product 808 comprises a computer program 810, which comprises code means, which when executed in the processing unit 806 in the arrangement in the RNC 800 causes the RNC 800 to perform the actions e.g. of the procedure described earlier in conjunction with FIG. 2.

The computer program 810 may be configured as a computer program code structured in computer program modules 810*a*-810*e*. Hence, in an exemplifying embodiment, the code means in the computer program of the arrangement in the RNC 800 comprises a receiving unit, or module, for receiving a notification from the RBS indicating that an Out Of Sequence has occurred for the series of frames; a frame size unit, or module, for increasing a frame size in order to reduce the number of frames; and a transmitting unit, or module, for transmitting the data using the increased frame size. The computer program modules could essentially perform the actions of the flow illustrated in FIG. 2, to emulate the RNC 600. In other words, when the different computer program modules are executed in the processing unit 806, they may correspond to the units 603-605 of FIG. 6.

Although the code means in the respective embodiments disclosed above in conjunction with FIGS. 5 and 6 are implemented as computer program modules which when executed in the respective processing unit causes the RBS and the RNC respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RBS and the RNC respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Radio Base Station (RBS) for transmitting data to a User Equipment (UE), the RBS receiving frames from a network node by means of a Radio Link Control (RLC) protocol, the method comprising:
    receiving a frame F1 from the network node, the frame having a sequence number N;
    if a last received frame F0, the frame F0 received prior to the received frame F1, has a sequence number lower than N−1, then starting a first timer T1 having a predefined length in time and temporarily storing the received frame F1;
    if a subsequent frame F2 is received having a sequence number lower than N and higher than the sequence number of frame F0, then storing the received frame F2; and
    when all frames having a sequence number between the sequence number of frame F0 and frame N have been received during the predefined length of the first timer T1, then forwarding the stored frames and/or received frames to the UE in the order of the sequence numbers.

2. The method according to claim 1, wherein the network node is a Radio Network Controller (RNC) and wherein the RBS and the RNC are operative to be employed in a Wideband Code Division Multiple Access (WCDMA) communication network.

3. The method according to claim 1, further comprising, if the first timer T1 expired before all frames having a sequence number between the sequence number of frame F0 and N were received, notifying a higher layer of a communication network in which the RBS is employed for informing that an Out Of Sequence (OSS) situation has occurred for a series of frames; increasing a frame size in order to reduce a number of frames to eliminate the Out Of Sequence situation occurred for the series of frames; and transmitting the data using the increased frame size.

4. The method according to claim 1, further comprising receiving a frame F3 from the network node having a sequence number higher than N+1 during the duration of the first timer T1, starting a second timer T2 having a predefined length in time and storing the received frame having sequence number higher than N.

5. The method according to claim 4, wherein the predefined length of the first timer T1 and the second timer T2 are hard coded into the RBS.

6. The method according to claim 4, wherein the predefined length of at least one of the first timer T1 and the second timer T2 is dynamically determined.

7. The method according to claim 6, wherein the predefined length of at least one of the first timer T1 and the second timer T2 is determined based on delay characteristics of the received frames and/or traffic network statistics.

8. The method according to claim 1, further comprising receiving a frame F3 from the network node having a sequence number equal to N+1 during the duration of the first timer T1, storing the received frame F3 and updating an upper sequence number parameter from N to N+1, wherein if receiving a further frame, the sequence number of the received further frame is checked if being between the sequence number of frame F0 and N+1.

9. The method according to claim 1, further comprising determining a number of missing frames based on the sequence number of frame F0 and frame F1, and starting a respective timer T1 for each missing frame.

10. The method according to claim 1, wherein the method is performed per Radio Access Bearer or Priority Queue.

11. The method according to claim 1, further comprising decoding Media Access Control Packet Data Unit (MAC-d PDU) of received frames to read or deduce RLC sequence number comprised therein and determining the order of sequence numbers to transmit the MAC-d PDUs to the UE.

12. A method performed by a Radio Network Controller (RNC) for transmitting data to a User Equipment (UE) via a Radio Base Station (RBS) employing a transport protocol, the RNC transmitting data by a series of frames to the RBS to be forwarded to the UE, the method comprising: receiving a notification from the RBS indicating that an Out Of Sequence situation has occurred for the series of frames; increasing a frame size in order to reduce a number of frames to eliminate the Out Of Sequence situation occurred for the series of frames; and transmitting the data using the increased frame size.

13. A Radio Base Station (RBS) adapted for transmitting data to a User Equipment (EU), the RBS receiving frames from a network node by means of a Radio Link Control (RLC) protocol, the RBS comprising a processor and a memory, the memory comprising instructions which when executed by the processor causes the RBS to:

receive a frame F1 from the network node, the frame having a sequence number;

if a last received frame F0, the frame F0 received prior to the received frame F1, has a sequence number lower than N−1, then start a first timer T1 having a predefined length in time and temporarily storing the received frame F1;

if a subsequent frame F2 is received having a sequence number lower than N and higher than the sequence number of frame F0, then store the received frame F2; and when all frames having a sequence number between the sequence number of frame F0 and frame N have been received during the predefined length of the first timer T1, then forward the stored frames and/or received frames to the UE in the order of the sequence numbers.

14. The RBS according to claim 13, wherein the network node is a Radio Network Controller (RNC) and wherein the RBS and the RNC are operative to be employed in a Wideband Code Division Multiple Access (WCDMA) communication network.

15. The RBS according to claim 13, wherein the memory further comprises instructions which when executed by the processor causes the RBS to, if the first timer T1 expired before all frames having a sequence number between the sequence number of frame F0 and frame N were received, notify a higher layer of a communication network in which the RBS is employed to inform that an Out Of Sequence (OSS) situation has occurred for a series of frames, increase a frame size in order to reduce a number of frames to eliminate the Out Of Sequence situation occurred for the series of frames; and transmit the data using the increased frame size.

16. The RBS according to claim 13, wherein the memory further comprises instructions which when executed by the processor causes the RBS to receive a frame F3 from the network node having a sequence number higher than N+1 during the duration of the first timer T1, to start a second timer T2 having a predefined length in time and to store the received frame having sequence number higher than N in the memory.

17. The RBS according to claim 16, wherein the predefined length of the first timer T1 and the second timer T2 are hard coded into the RBS.

18. The RBS according to claim 16, wherein the predefined length of at least one of the first timer T1 and the second timer T2 is dynamically determined.

19. The RBS according to claim 18, wherein the predefined length of at least one of the first timer T1 and the second timer T2 is determined based on delay characteristics of the received frames and/or traffic network statistics.

20. The RBS according to claim 13, wherein the memory further comprises instructions which when executed by the processor causes the RBS to receive a frame F3 from the network node having a sequence number equal to N+1 during the duration of the first timer T1, to store the received frame F3 and update an upper sequence number parameter from N to N+1, wherein if receiving a further frame, the sequence number of the received further frame is checked for being between the sequence number of frame F0 and frame N+1.

21. The RBS according to claim 13, wherein the memory further comprises instructions which when executed by the processor causes the RBS to determine a number of missing frames based on the sequence number of frame F0 and frame F1, and to start a respective timer T1 for each missing frame.

22. The RBS according to claim 13, wherein the RBS is adapted to perform the method per Radio Access Bearer or Priority Queue.

23. The RBS according to claim 13, wherein the memory further comprises instructions which when executed by the processor causes the RBS to decode Media Access Control Packet Data Unit (MAC-d PDU) of received frames to deduce RLC sequence number comprised therein and to determine the order of sequence numbers to transmit the MAC-d PDUs to the UE.

24. A Radio Network Controller (RNC) adapted for transmitting data to a User Equipment (UE) via a Radio Base Station (RBS) employing a transport protocol, the RNC transmitting data by a series of frames to the RBS to be forwarded to the UE, the RNC comprising a processor and a memory, the memory comprising instructions which when executed by the processor causes the RNC to: receive a notification from the RBS indicating that an Out Of Sequence situation has occurred for the series of frames; increase a frame size in order to reduce a number of frames to eliminate the Out Of Sequence situation occurred for the series of frames; and transmit the data using the increased frame size.

* * * * *